(12) United States Patent
Hoskins

(10) Patent No.: US 6,892,250 B2
(45) Date of Patent: May 10, 2005

(54) COMMAND QUEUE PROCESSOR

(75) Inventor: Edward Sean Hoskins, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 693 days.

(21) Appl. No.: 09/773,942

(22) Filed: Jan. 31, 2001

(65) Prior Publication Data

US 2001/0028524 A1 Oct. 11, 2001

Related U.S. Application Data

(60) Provisional application No. 60/181,164, filed on Feb. 9, 2000.

(51) Int. Cl.[7] .............................................. G06F 13/14
(52) U.S. Cl. ................................ 710/6; 710/40; 710/41
(58) Field of Search ................................ 710/6, 40, 41, 710/123

(56) References Cited

U.S. PATENT DOCUMENTS

| | | |
|---|---|---|
| 5,276,662 A | 1/1994 | Shaver, Jr. et al. |
| 5,291,614 A | 3/1994 | Baker et al. |
| 5,394,547 A | 2/1995 | Correnti et al. |
| 5,410,722 A * | 4/1995 | Cornaby ..................... 718/102 |
| 5,548,795 A | 8/1996 | Au |
| 5,570,332 A | 10/1996 | Heath et al. |
| 5,664,143 A | 9/1997 | Olbrich |
| 5,729,718 A | 3/1998 | Au |
| 5,787,482 A | 7/1998 | Chen et al. |
| 6,003,101 A | 12/1999 | Williams |
| 6,032,207 A | 2/2000 | Wilson |
| 6,038,585 A | 3/2000 | Togawa |
| 6,047,308 A | 4/2000 | Grummer et al. |
| 6,055,533 A | 4/2000 | Hogge |
| 6,483,846 B1 * | 11/2002 | Huang et al. ............... 370/445 |
| 6,587,894 B1 * | 7/2003 | Stracovsky .................... 710/6 |

OTHER PUBLICATIONS

Texas Instruments Alex Tessarolo, Mar. 1998, TMS320C27x—New Generation of Embedded Processor Looks Like a $\mu$C, Runs Like a DSP, White Paper: SPRA446; pp. 1–24.

Texas Instruments, Aug. 1999, TMS320C2x/C2xx/C5x—Optimizing C Compiler User's Guide; pp. i–Index 14.

Texas Instruments, unknown, Chapter 2, Central Processing Unit for Texas Instruments CPU architecture; origin www.TI.com; documents no longer available as of Apr. 16, 2001.

Texas Instruments, unknown, Chapter 6, Assembly Language Instructions for Texas Instruments 27xx Type Digitizing Signal Processors; origin www.TI.com; documents no longer available as of Apr. 16, 2001.

* cited by examiner

*Primary Examiner*—A. Elamin
(74) *Attorney, Agent, or Firm*—David K. Lucente; Derek J. Berger

(57) ABSTRACT

Optimal command nodes are selected in a computing device having multiple command node queues by a method which identifies a command node in a first queue and determines if the identified command node collides with a command node in a second queue. If a collision between the identified command node and a command node in the second queue is determined, the collision is corrected and the identified command node then may be moved into the second queue. The second queue is then sorted according to a predetermined routine to select the optimal command node.

33 Claims, 7 Drawing Sheets

COMMAND QUEUE PROCESSOR

RELATED APPLICATIONS

This application claims priority of U.S. provisional application Ser. No. 60/181,164, filed Feb. 9, 2000.

FIELD OF THE INVENTION

This application relates generally to command queue processing and more particularly to a method for selecting an optimal command node in a computing device having multiple command node queues.

BACKGROUND OF THE INVENTION

Many computing devices use microprocessors to execute commands. Typically, the computing device can accommodate multiple microprocessor commands. For example, the microprocessor in a disc drive device may receive multiple commands to read and write data to the hard discs within the disc drive. When commands are received in a computing device faster than the microprocessor can execute the commands, the commands are typically held in a command queue to await their turn for processing by the microprocessor.

The simplest type of command queue is a first-come-first-serve command queue. This type of queue, as the name implies, simply presents the commands to the processor in the order that they are received. The first-come-first-serve queue is simple to implement as it does not require a sophisticated routine to maintain the queue. The first-come-first-serve queue, however, does not allow for any type of optimization of the ordering of the commands.

Command optimization is particularly important in computing devices, such as disc drives, where high-speed data though-put is required. In a disc drive, commands are often received faster than they can be executed. When this occurs, the command which are waiting to be executed need to be queued or cashed for later processing. As the commands coming into the disc drive may are not necessarily received in an optimal order for processing, optimization of the queued or cached commands is desirable. For instance, a disc drive device may receive commands to read and write data at a variety of locations on the hard discs within the disc drive. Optimally, these commands would be processed in a manner which would minimize the movement of the disc drives read/write heads across the disc. Ordering the commands in this manner is called command queue reordering. Command queue reordering allows for a more efficient use of the microprocessor as well as a more efficient use of the hardware, if any, being controlled by the microprocessor.

There are a number of ways to order the commands in a priority queue. Traditionally, disc drives have sorted commands in an order that minimizes seek time between the various commands. The seek time is the time required for the read/write element to radially move across or traverse cylinders between the present cylinder over which the read/write element is positioned and the cylinder to be addressed by the particular command. However, seek time is only one of two components of the true access time of a command. The other component is the rotational latency time or the amount of time the disc drive spends waiting for the appropriate data to rotate under the read/write element. The rotational latency time is a significant part of the total access time for all but the longest seeks. On average, it is the dominant component of the total access time for relatively short seeks.

Accordingly, there is a continual need for improvements in the art whereby priority queues can be optimized, particularly in disc drives where read/write command nodes may be ordered such that disc latency may be minimized.

SUMMARY OF THE INVENTION

Against this backdrop the present invention has been developed. One aspect of the present invention involves a method for the selection of command nodes in a computing device having multiple command node queues. The method involves identifying a command node in a first queue and determines if the identified command node collides with a command node in a second queue. If a collision between the identified command node and a command node in the second queue is determined, the collision is preferably corrected and the identified command node may then be moved into the second queue. The second queue is then sorted according to a predetermined routine to select the optimal command node.

Another aspect of the present invention relates to a system for managing command nodes in a computing device. The system preferably including a microprocessor, computer-readable media, and a data structure stored on the computer-readable media. The data structure preferably comprises an insert queue comprising at least one command node, a sorted queue comprising at least one command node selected from the insert queue, and a ready queue comprising at least one command node selected from the sorted queue according to an predefined optimization scheme.

Yet another aspect of the present invention relates to a computer-readable media having stored thereon an insert queue, a sorted, a ready queue, a number of queue managers, and a scheduler operable for scheduling the execution of the queue managers in a microprocessor. Each of the queue managers preferably comprises a microprocessor-executable code operable for directing a microprocessor. The command queue manager is preferably operable for populating command nodes with command data and for inserting populated command nodes into the insert queue. The insert queue manager is preferably operable for determining whether a command node within the insert queue collides with a command node in the sorted queue, for correcting any collisions between a command node within the insert queue and a command node in the sorted queue, and for extracting a non-colliding command node from the insert queue and inserting the non-colliding command node into the sorted queue. The sorted queue manager is preferably operable for selecting an optimal command node from the sorted queue in accordance with a predefined sorting scheme.

Another aspect of the present invention relates to a method of selecting an optimal command node in a computing device having an insert queue contain at least one command node and a sorted queue contain at least one command node. This method preferably comprising the steps of identifying a command node in the insert queue, determining if the identified command node collides with a command node in the sorted queue, sorting the sorted queue according to a predetermined routine to determine the optimal command node, and selecting the determined optimal command node. The step of determining if the identified command node collides with a command node in the sorted queue further includes moving the identified command node from the insert queue into the sorted queue if no collision is detected or correcting the collision between the identified command node and the collided with command node if a collision is detected.

These and various other features as well as advantages which characterize the present invention will be apparent from a reading of the following detailed description and a review of the associated drawings.

DETAILED DESCRIPTION

In general, the present disclosure describes methods and systems for managing and processing a command node queue in a computing device. More particularly, the present disclosure describes a method and system for managing and processing multiple queues in a disc drive multiprocessing computing device. More particularly still, the present disclosure describes a queue processing computer program for queuing and reordering commands in a disc drive microprocessor.

The following describes an embodiment of the present invention as applied to command node queue processing in a hard disc drive. It will be apparent to those of ordinary skill in the art that the present invention can also be used in other environments where queue processing is useful or necessary, such as phone queues, package delivery methods, taxi queuing, etc.

The logical operations of the queue processor herein described may be implemented (1) as a sequence of microprocessor implemented acts or program modules running on a microprocessor and/or (2) as interconnected machine logic circuits or circuit modules within a computing device. The implementation is a matter of choice dependent on the performance requirements of the queue processor. Accordingly, the logical operations making up the embodiments of the queue processor described herein may be referred to variously as operations, routines, structural devices, acts, or modules. While the following embodiments of the queue processor are discussed as being implemented as software, it will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 1:
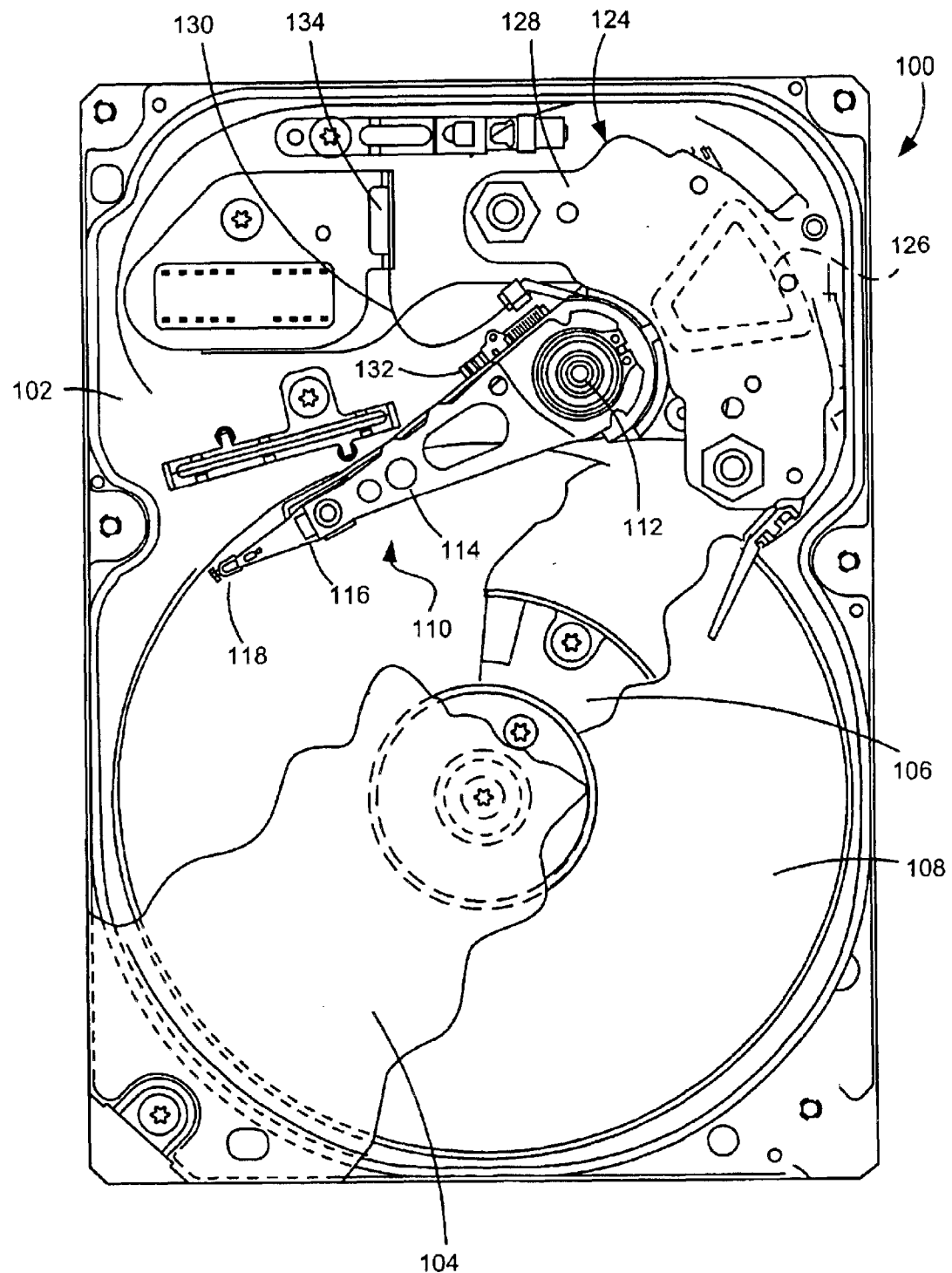
FIG. 1 is a plan view of a disc drive assembly in accordance with the present invention with the head disc assembly cover partially broken away and with portions of the discs broken away.

Referring to FIG. 1, a disc drive 100 in which the methods and system of the present invention may be practiced is shown. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base 102 to a disc drive printed circuit board (not shown) mounted to the bottom side of the disc drive 100.

Figure 2:
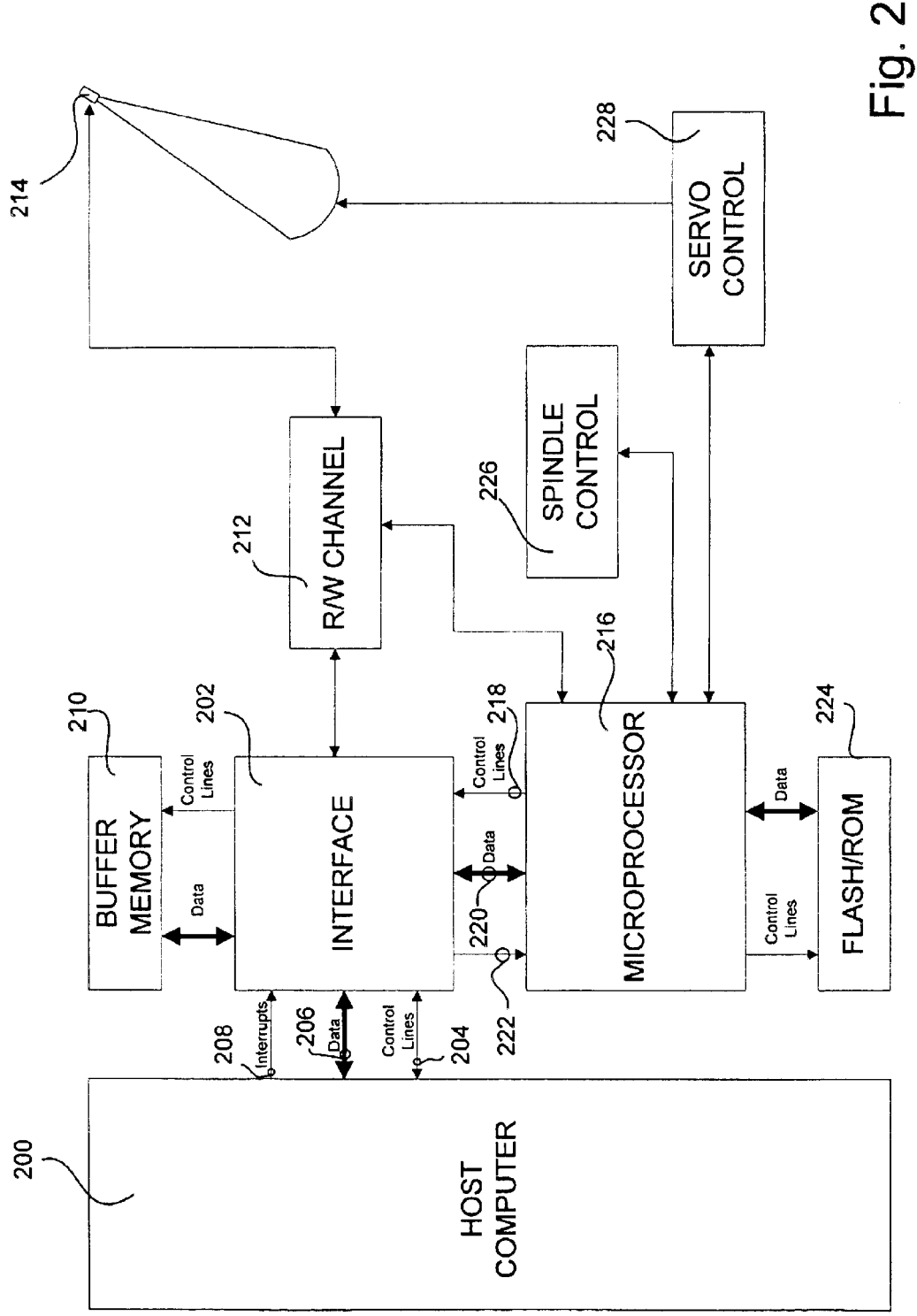
FIG. 2 is a simplified functional block diagram of the disc drive shown in FIG. 1.

Referring now to FIG. 2, shown therein is a functional block diagram of the disc drive 100 of FIG. 1, generally showing the main functional circuits which are typically resident on a disc drive printed circuit board and which are used to control the operation of the disc drive 100. As shown in FIG. 2, the host computer 200 is operably connected to an interface application specific integrated circuit (interface)

202 via control lines 204, data lines 206, and interrupt lines 208. The interface 202 typically includes an associated buffer 210 which facilitates high speed data transfer between the host computer 200 and the disc drive 100. Data to be written to the disc drive 100 are passed from the host computer to the interface 202 and then to a read/write channel 212, which encodes and serializes the data and provides the requisite write current signals to the heads 214. To retrieve data that has been previously stored by the disc drive 100, read signals are generated by the heads 214 and provided to the read/write channel 212, which performs decoding and error detection and correction operations and outputs the retrieved data to the interface 202 for subsequent transfer to the host computer 100. Such operations of the disc drive 200 are well known in the art and are discussed, for example, in U.S. Pat. No. 5,276,662 issued Jan. 4, 1994 to Shaver et al.

As also shown in FIG. 2, a microprocessor 216 is operably connected to the interface 202 via control lines 218, data lines 220, and interrupt lines 222. The microprocessor 216 provides top level communication and control for the disc drive 200 in conjunction with programming for the microprocessor 216 which is typically stored in a microprocessor memory (MEM) 224. The MEM 224 can include random access memory (RAM), read only memory (ROM) and other sources of resident memory for the microprocessor 216. Additionally, the microprocessor 216 provides control signals for spindle control 226, and servo control 228.

Figure 3:
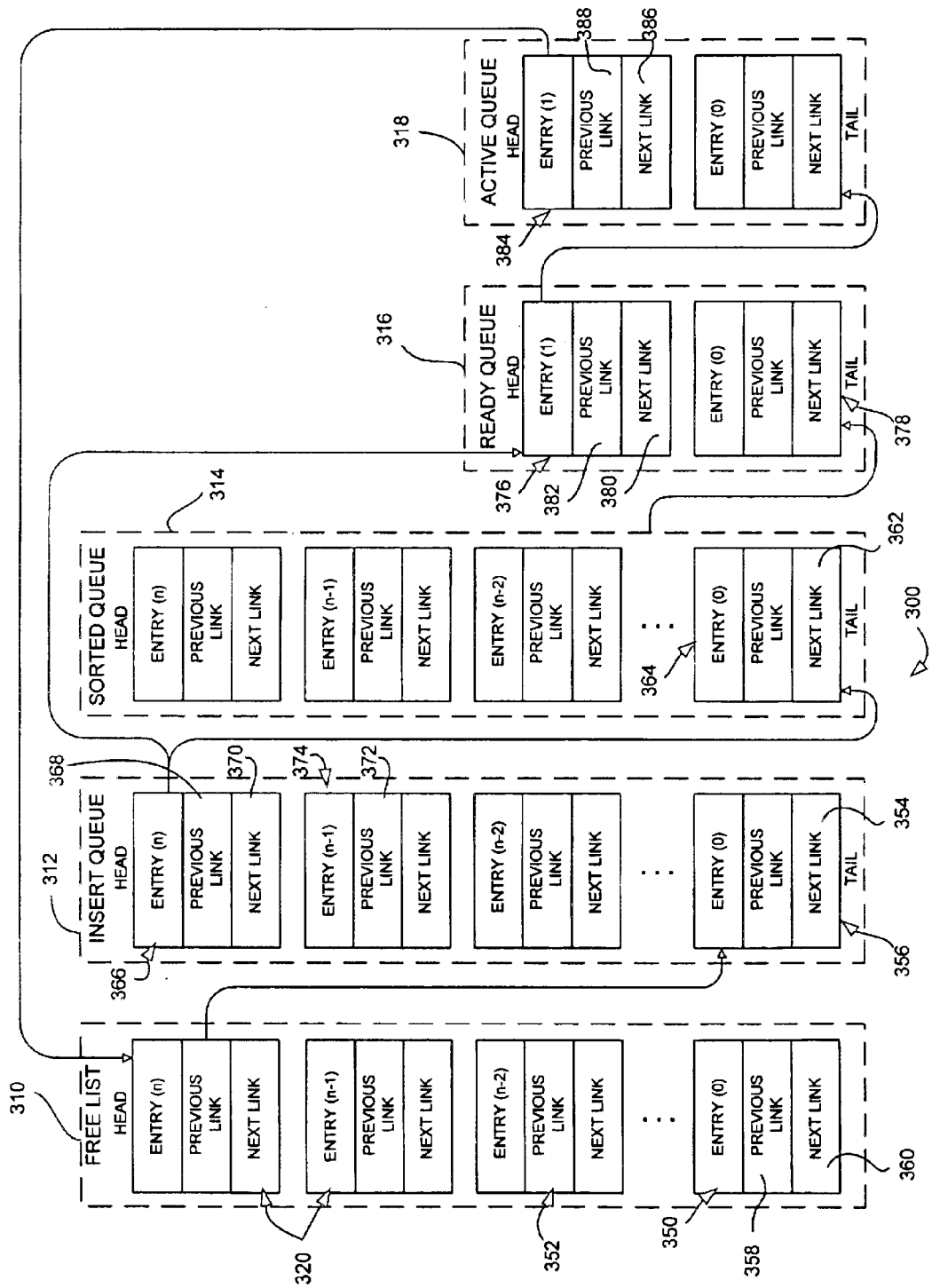
FIG. 3 illustrates an embodiment of a command node queue processor having a plurality of queues.

As shown in FIG. 3, an embodiment of the present invention comprises a queue processor 300 having five managed queues: a free list queue 310, an insert queue 312, a sorted queue 314, a ready queue 316, and an active queue 318. In general, the queues are used to allocate, sort, and execute command nodes in computer-readable media, such as the memory 210 of the microprocessor 216 of the disc drive through pointer manipulation.

Computer readable media, as used herein, can be any available media that can be accessed by a microprocessor, such as the disc drive microprocessor 316 described above. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disc storage or other magnetic storage devices, or any other medium that can be used to store the desired information and that can be accessed by the computing system 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

As shown in FIG. 3, each of the queues 310, 312, 314, 316, and 318, comprises a data structure containing a number of command nodes 320. A command node 320 is a predefined data structure consisting of a number of fields which contain the information necessary to carry out a command in a microprocessor, such as the disc drive microprocessor 216. (FIG. 2) For clarity, FIG. 3 illustrates the command nodes 320 in a simplified manner wherein only a next link 304, a previous link 306, and an entry field 308 of the command nodes 320 are shown.

Figure 4:
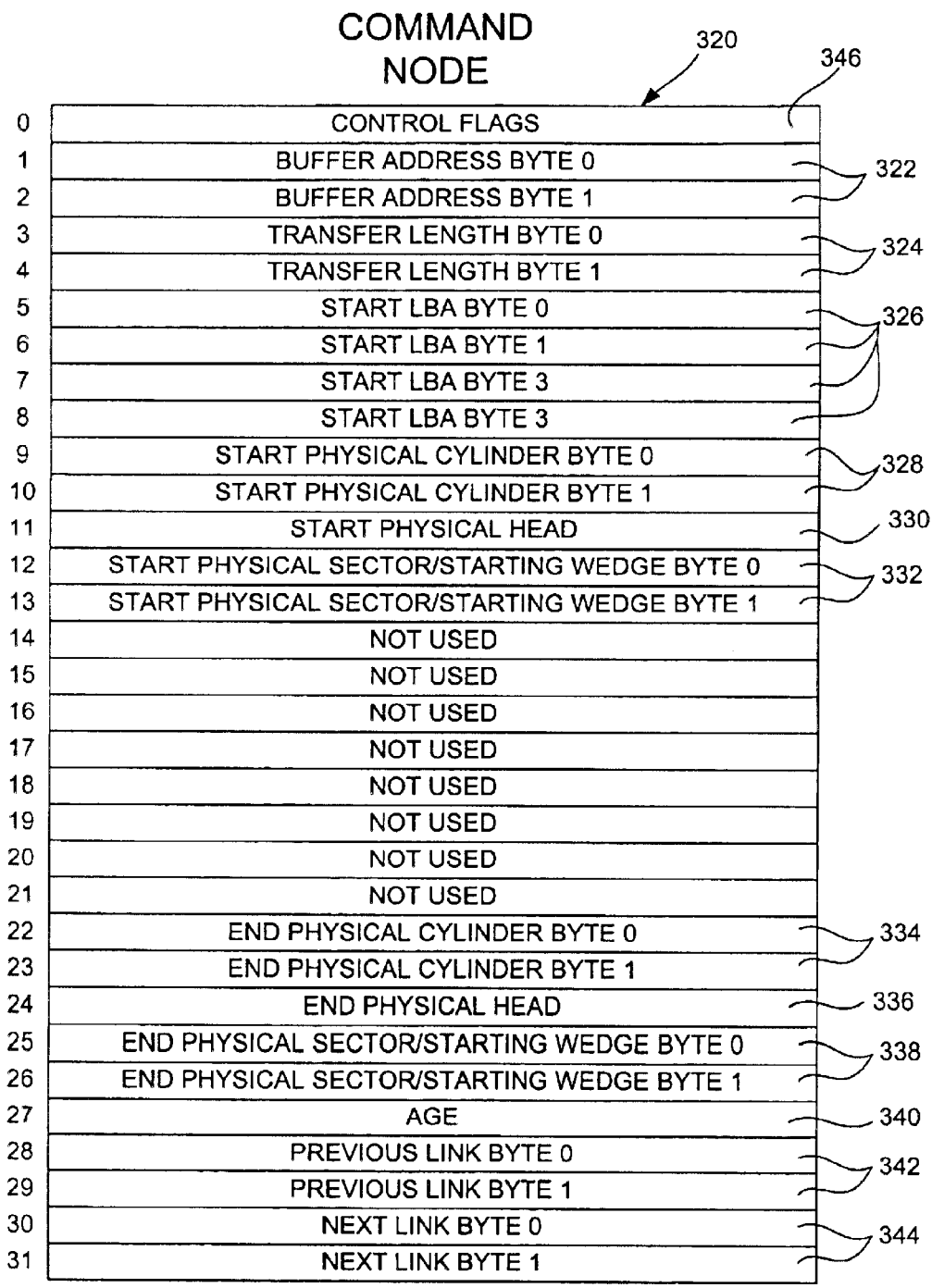
FIG. 4 illustrates an exemplary command node for the command node queue processor shown in FIG. 3.

Command nodes 320 typically include a number of fields containing data relevant to specific commands and specific systems. For example, as shown in FIG. 4, a command node for a disc drive, such as disc drive 100, may include fields which specify the buffer address of the information to be transferred 322, the transfer length of the information to be transferred, the start of the logical block address (LBA) issued or requested by the host computer 326, the start of the physical cylinder where data is to be written/read 328, the start of the physical head 330, the start of the physical sector/starting wedge where data is to be written/read 332, the end of the physical cylinder where data is to be written/read 334, the end of the physical head 336, the end of the physical sector/starting wedge where data is to be written/read 338, the end of the physical cylinder where data is to be written/read 340. Additionally, each command node 320 preferably includes fields for a previous link pointer 342 and a fields for a next link pointer 344.

A command node 320 will also typically include a field for specifying what type of command (read, write, etc.) is to be executed in relationship to the command node 320. For example, as shown in FIG. 4, the command node 320 may include a field 346 for control flags which specify the command associated with the command node 340. The structure of the command node 320, that is the number of fields and the types of data which are required in the fields is dependent on the types of commands executed by the system and by the type of system employing the queue processing program, such as a SCSI device or an AT device. The structure of the command node 320 is preferably set at the compile time of the queue processing program. It should be understood that the command node 320 illustrates but one example of the configuration and contents of a command node for a disc drive device. Any number of different command node configurations and contents may be used depending on the environment or application in which or for which the queue processor 300 may be used or employed.

Four of the queues 312, 314, 316, and 318 of the queue processor 300 preferably reside in computer readable media, such as buffer memory 210, and are preferably defined by a doubly-linked list structures and by indicators which indicate the locations of the heads and tails of the queues. Preferably, the indicators comprise pointers located within a registers in a microprocessor, such as disc drive microprocessor 216. For illustration purposes indicators will be discussed herein as pointers, however, it is to be understood that the indicators may comprise other types of mechanisms which are operable to indicate the locations of the heads and tails of the various queues.

The free list queue 310 is preferably defined by a singly-linked structure and by a register which contains a pointer which points to the command node at the head of the free list queue 310. At initialization of the queue processor 300 the pointers in the registers which point to the heads and tails of insert queue 312, sorted queue 314, ready queue 316, and active queue 318 are all set to null. At initialization of the queue processor 300 the register which points to the head of free list queue 310 is set to point to the first available command node after initialization.

The free list queue 310 is preferably defined by a singly-linked list of free, or unused command nodes within memory, such as the buffer memory 210 of the disc drive 100. While the structure of a command node 320 in the free list queue 310 is shown as including fields for both next link 304 and previous link 306 pointers, preferably only the next link pointer 304 fields of the command nodes 320 are used in the free list queue 310. The free list queue 310 provides a source for free or unused command nodes for the queue processor 300. The size of the free list queue 310 is preferably limited only by the amount of memory, such as buffer memory 210, allocated to the queue processor 300 at the compile time of the queue processor 300, minus the amount of memory being used by the other queues 312, 314, 316, and 318 of the queue process, or by other processes implemented by the microprocessor.

The insert queue 312 is preferably a doubly-linked list containing command nodes 320 which have been extracted, or de-queued, from the free list queue 310 and which have been populated by the incoming commands from, for example, the host computer 200 via the interface 202 of the disc drive 100. Extraction of a command node 320 from the free list queue 310, population of the command node 320, and insertion of the command node 320 into the insert queue 312, in a disc drive device, such as disc drive 100, preferably occurs as described in the following example. It will be understood to one skilled in the art that the terms extracting, inserting, and moving as used relative to repositioning command nodes from one queue to another does not necessarily mean that the command nodes are physically moved from one location in memory to another. As is well known in the art, the location of a command node or other element in a data structure such as a queue is often defined by the relationship of the command nodes to one another as defined by the rules or format of the data structure. For example, in the command nodes 320 as described above, previous link pointers 342 and next link pointers 344 may be used to redefine a command nodes location within a particular queue without moving that command node from one physical memory location to another.

It is to be understood that the following example is but one example of a possible implementation of and environment for the queue processor 300, and that any number of other implementations of the queue processor may be contemplated which are well within the scope of the present invention.

When a command comes into disc drive 100 from the host computer 200, the interface 202 typically fills in the data fields of the command node 350 located at the head of free list queue 310 with the appropriate information for effectuating the command in the disc drive 100. If the insert queue 312 is empty, the pointers in the registers which point to the command node(s) at the head and tail of the insert queue 312 are set to point to the command node 350 at the head of the free list 310, and the pointers in the next link field 360 and the previous link field 358 of the command node 350 at the head of the free list 310 are set to null. Additionally, the pointer in the register which points to the command node at the head of the free list queue 310 is set to point to the next command node 352 in the free list queue 310.

If the insert queue 312 is not empty, the pointer in the next link field 354 of the command node 356 at the tail of insert queue 312 is set to point to the command node 350 at the head of the free list queue 310. The pointer in previous link field 358 of the command node 350 at the head of the free list queue is set to point to the command node 356 at the tail of the insert queue 312 and the pointer in next link field 360 of the command node 350 at the head of the free list queue 310 is set to point to null. Additionally, the pointer in the register which points to the command node at the head of free list queue 310 is set to point to the next command node 352 in the free list queue 310, and the pointer in the register which points to the insert queue tail is set to point to the command node 350 at the head of the next free list queue. In this way, command node 350 at the head of the free list queue becomes or is inserted into the command node at the tail of the insert queue 312.

As commands continue to come into the disc drive 100 from the host, command nodes 320 are extracted from free list queue 310, populated with command data, and inserted into the tail of insert queue 312, and the head of free list queue 310 and tail of insert queue 312 are redefined as just described. The insert queue 312 continues to grow as new commands are populated and inserted in the insert queue 312. The size of the insert queue 312 is bounded only by the available memory allocated to the queue processor minus the amount of memory being used by the other queues 310, 314, 316, and 318.

The sorted queue 314 is a doubly-linked list which provides a "holding area" for command nodes 320 which have been extracted from the insert queue 312 and inserted in the sorted queue 314, and which are waiting to be sorted and inserted into the ready queue 316. Command nodes 320 are preferably extracted from the insert queue 312 and inserted into the sorted queue 314 only when the ready queue 316 is not empty. If the ready queue 316 is empty, command nodes 320 are extracted from the head of the insert queue 312 and inserted into the tail of the ready queue 316, "bypassing" the sorted queue 314.

In the case where the ready queue 316 is empty and the sorted queue 314 is bypassed, extracting a command node 320 from the insert queue 312 and inserting that command node 320 into the ready queue 316 preferably occurs as follows. The pointers in previous link field 368 and the next link field 370 of the command node 366 at the head of the insert queue 312 are set to null. The pointer in the previous link field 372 of the command node 374 in the insert queue 312 is also set to null. Additionally, the pointer in the register which points to the command node at the head of insert queue 312 is set to point to the next command node 374, in insert queue 312, and the pointers in the registers which points to the head and tail of ready queue 316 are set to point to the command node 366 at the head of the insert queue 312. In this way, the command node 366 at the head of the insert queue 312 becomes, or is inserted into, the ready queue, bypassing the sorted queue 314.

When the ready queue 316 is not empty, command nodes 320 from the insert queue 312 are preferably extracted from the head of the insert queue 314 and inserted in the tail of the sorted queue 314 as follows. Before a command node 320 is extracted from insert queue 312 and inserted into the sorted queue 314 a determination must be made as to whether there is a "collision" between the command node 320 being extracted from the head of the insert queue 312 and any of the command nodes in sorted queue 314. That is, a determination must be made as to whether there are any undesired overlaps or incompatibilities of the commands embodied in the command node 320 being extracted from insert queue 312 and any of the command nodes 320 in the sorted queue 314. If a collision is detected between the command node 320 being extracted from the insert queue 312 and any of the command nodes in the sorted queue 314, action must be taken to avoid the collision. For example, in the case where a command node 320 at the head of the insert queue 312 includes a write command to a particular area on a disc 108 of the hard drive 100, a determination must be made as to whether the area of the disc 108 which is to be written to by the write command overlaps, is a subset of, or a superset of an area of the disc 108 which is to be written to by a command in a command node 320 located in sorted queue 314. If the area of the disc 108 which is to be written to by the write command overlaps or is a subset of an area of the disc 108 which is to be written to by a command in a command node 320 located in the sorted queue 314, a collision has occurred and this collision must be corrected before the command node 320 at the head of the insert queue 312 can be inserted into the sorted queue 314.

The correction of a collision between a command node 320 at the head of the insert queue 312 and a command node 320 in the sorted queue 314 may occur in a number of ways and is dependent on the type of commands issued in the system using the queue processor 300. For example, if the collision occurs between two command nodes which include write commands to the disc 108 of a disc drive 100, collision correction may occur as follows. If a write command of a command node 320 at the head of the insert queue 312 fully overlaps a write command of a command node 320 in the sorted queue 314, then the command node, including the fully overlapped write command, is removed from the sorted queue 314. If a write command of a command node 320 at the head of the insert queue 312 partially overlaps a write command of a command node 320 in the sorted queue 314, then the write command of the command node in the sorted queue 314 is adjusted or truncated so the overlap is eliminated. Finally, if a write command of a command node 320 at the head of the insert queue 312 is a subset of a write command of a command node 320 in the sorted queue 314, then the command node at the head of the insert queue 312 should be held in the insert queue 312 until the colliding command node 320 in the sorted queue 314 is no longer present in the sorted queue 314. Collision correction enhances the speed of commands through the queue processor 300 by removing or correcting those commands which are duplicative or overlapping. The following example is but one illustration of a possible collision correction mechanism in the queue processor 300. A number of other collision correction mechanisms may be contemplated and implemented in the queue processor without departing from the scope of the present invention.

If no collision has been detected between the command node 320 at the head of the insert queue 312 and a command node 320 in the sorted queue 314, or if a collision has been detected and corrected, the extraction of the command node 320 from insert queue 312 and insertion of that command node 320 into the sorted queue 314 preferably occur as follows. If the sorted queue 314 is empty, the pointers in the registers which point to the command node(s) at the head and tail of the sorted queue 314 are set to point to the command node 366 at the head of the insert queue 312 and the pointers in the next link field 370 and the previous link field 368 of the command node 366 at the head of the insert queue 312 are set to null. Additionally, the previous link field 372 of the next command node 370 is set to null and the pointer in the register which points to the command node at the head of insert queue 312 is set to point to the next command node 374, in insert queue 312.

If the sorted queue 314 is not empty, the pointer in next link field 362 of command node 364 at the tail of sorted queue 314 is set to point to the command node 366 at the head of insert queue 312. The pointer in previous link field 368 of the command node 366 at the head of the insert queue 312 is set to point to command node 364 at the tail of the sorted queue 312 and the pointer in next link field 370 of the command node 366 at the head of the insert queue 312 is set to point to null. The pointer in previous link field 372 of the command node 374 in the insert queue 312 is set to null. Additionally, the pointer in the register which points to the command node at the head of the insert queue 312 is set to point to the next command node 372 in the insert queue 312, and the pointer in the register which points to the tail of the sorted queue 314 is set to point to the command node 366 at the head of the insert queue 312. In this way, the command node 366 at the head of the insert queue 312 becomes, or is inserted into, the sorted queue 314.

The ready queue 316 is a doubly-linked list preferably containing a maximum of two linked list nodes 324 and 326. As described above, the command nodes 320 in the ready queue 316 have been extracted either from the head of the insert queue 312 or from the sorted queue 314 and inserted into the ready queue. The ready queue 316 holds the next command node 320 that is nearest the commands in the active queue 318. By using two entries in the ready queue 316 different levels of sorting optimization are possible.

In the case where a command node 320 is extracted from the sorted queue 314 for insertion into the ready queue 316, the command 320 which is to be inserted into the ready queue 316 from the sorted queue 314 is sorted or selected according to a predefined scheme. For example, command nodes 320 for read and/or write commands in the disc drive 100 may be sorted to optimize seek time or rotational latency. Typically, the sorting algorithm being applied to the sorted queue 314, will compare various fields within the command nodes 320 in the sorted queue 314 to determine the preferred or optimal command node 320 for a specified optimization. A number of different sorting algorithms may be used to determine which of the nodes in the sorted queue 314 is optimal. However, a Rotational Positioning Sorting (RPS), or traveling salesmen type algorithm is preferably used to sort the sorted queue 314. For example, the algorithm described in U.S. Pat. No. 5,570,332 for "Method for Reducing Rotational Latency in a Disc Drive" to Heath, et al., which is incorporated herein by this reference may be used to sort the sorted queue 314.

After a command node 320 has been selected from the sorted queue 314, the selected command node 320 is preferably then be inserted into the ready queue 316 if the ready queue 316 includes only one command node 320. If the ready queue 316 includes two command nodes 320, insertion of the command node 320 from the sorted queue 314 must be delayed until the ready queue 316 includes only one command node 320. If the ready queue 316 is empty, insertion of the command node 320 from the sorted queue must be delayed until a command node is inserted in the ready queue 316 from the insert queue 312, as described above. If the ready queue 316 includes only one command node 320, the pointer in the previous link field of the command node 320 which has been selected from the sorted queue 314 is set to point to the single command node in the ready queue 316 and the pointer in the next link field of the selected command node 320 is set to null. The pointer in next link field 374 of the command node 376 at the head of the ready queue 316 is set to point to the selected command. Additionally, the pointer in the register which points to the command node at the tail of the ready queue 316 is set to point to the selected command 320.

The active queue 318 is a doubly linked list which preferably includes only two command nodes 328 and 330. The active queue 318 contains the command nodes which are currently being processed by the microprocessor of the disc drive. By including two command nodes 328 and 330 the active queue 318 allows for two command nodes to be processed simultaneously, such as command nodes which control access to two different, separately controlled actuators.

Commands nodes are preferably extracted from the head of the ready queue 316 and inserted into the active queue 318 as follows. If the active queue 318 is empty, the pointers which point to the command nodes at the head and tail of the active queue 318 are set to point to the command 376 at the head of ready queue 316. The pointer in the register which points to the head of the ready queue 316 is then set to point to the command node 378 at the tail of the ready queue 316. Additionally, the pointers in the next link field 380 and previous link field 382 of the command node 376 at the head of the ready queue 316 are set to null.

If the active queue 318 contains only one command node 320, the pointer in the register which points to the command node at the tail of the active queue 318 is set to point to the command node 376 at the head of the ready queue 316 and the pointer in the register which points to the command node 320 at the head of the ready queue 316 is set to point to the command node 378 at the tail of the ready queue 316. Additionally, the pointer in the previous link field 382 of the command node 376 at the head of the ready queue (now in the active queue 318) is set to point to the command node 384 at the head of active queue 318.

Once a command node is locate at the head of the active queue 318 the command node may be called by the microprocessor, such as microprocessor 216 of disc drive 100. Once the command node is called by the microprocessor, it is parsed and the information in that command node tells the microprocessor what actions to take, such as where to seek (what cylinder and physical head to select), where in buffer memory data is to be taken from, and the length of the transfer.

After a command node has been called or used by a system (a "used command node"), such as the microprocessor 216 of disc drive 100, the used command node is preferably returned to the free list queue 310 as follows. The pointer in the next link field 386 of the used command node 384 at the head of the active command queue 318 is set to point to the command node 350 at the tail of the free list queue 310 and the pointer in the previous link field 388 of the used command node 384 at the head of the active queue 318 is set to null. Additionally, the register which points to the command node 320 at the head of the active queue 318 is set to point to the command node 320 at the tail of the active queue 318 and the pointer in the register which points to the head of the free list queue 310 is set to point to the command node 384 at the head of the active queue 318.

Figure 5:
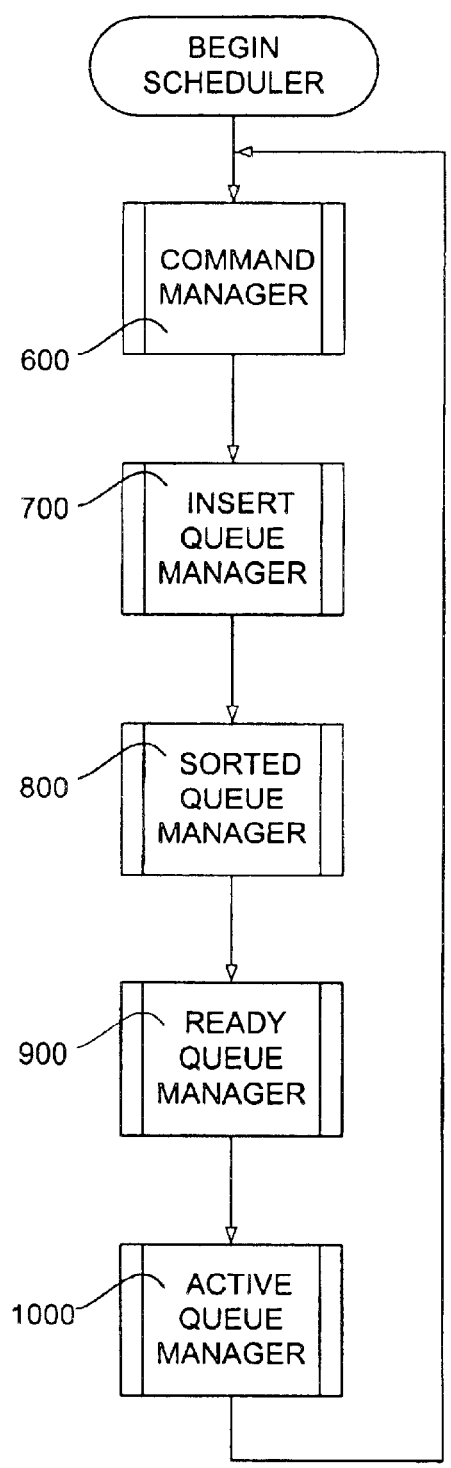
FIG. 5. illustrates an exemplary operational flow of a scheduler for the command node queue processor shown in FIG. 3.

An additional understanding of the functioning of the queue processor and the manipulation of the five queues 310, 312, 314, 316, and 318, may be had by reference to the flow diagrams shown in FIGS. 5–10. FIG. 5 shows one possible simplified flow of the execution of the queue processor 300 as carried out by a circular, or round robin scheduling routine 500 which sequentially calls a series of queue management routines such as those shown in FIGS. 6, 7, 8, 9, and 10. The flow diagram of the scheduling routine 500 shown in FIG. 5 and the flow diagrams of the queue management routines 600, 700, 800, 900, and 1000, shown in FIGS. 6, 7, 8, 9, and 10, are not intended to comprehensively and exclusively lay out the operational flow of the queue processor 300. Rather, the flow charts shown in FIGS. 5, 6, 7, 8, 9, and 10 are intended to give an overview of one possible manner of implementing the queue processor 300.

Figure 6:
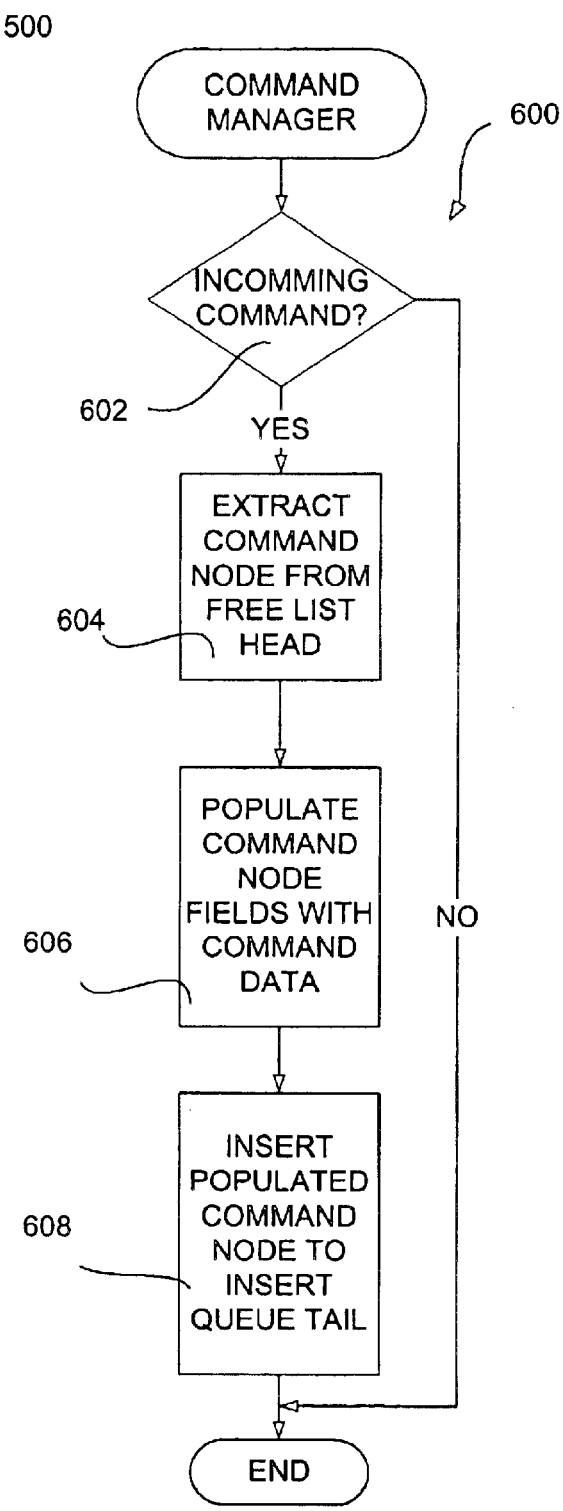
FIG. 6. illustrates an exemplary operational flow of a command manager for the command node queue processor shown in FIG. 3.

As shown in FIG. 5, a circular, or round robin scheduler 500 may be used to sequentially call a number of queue management routines, such as the queue management routines 600, 700, 800, 900, and 1000, which control the execution of the queue processor 300. Upon the start of the scheduler 500, the command manager 600 is called by the scheduler 500 to process an incoming command 300. As shown in FIG. 6, upon entry into the command manager routine 600 an incoming command detector 602 determines or tests whether a command is incoming to the queue processor 300. If a command is not incoming to the queue processor 300, the command manager routine 600 is ended or exited. If a command is incoming to the queue processor 300, an extract operation 604 extracts a command node from the head of the free list queue 310. A populate operation 606 then populates the fields of the extracted command node with data for the incoming command. An insert operation 608 then inserts the populated command into the tail of the insert queue 312. Finally, the command manager routine 600 is completed and ended or exited.

Figure 7:
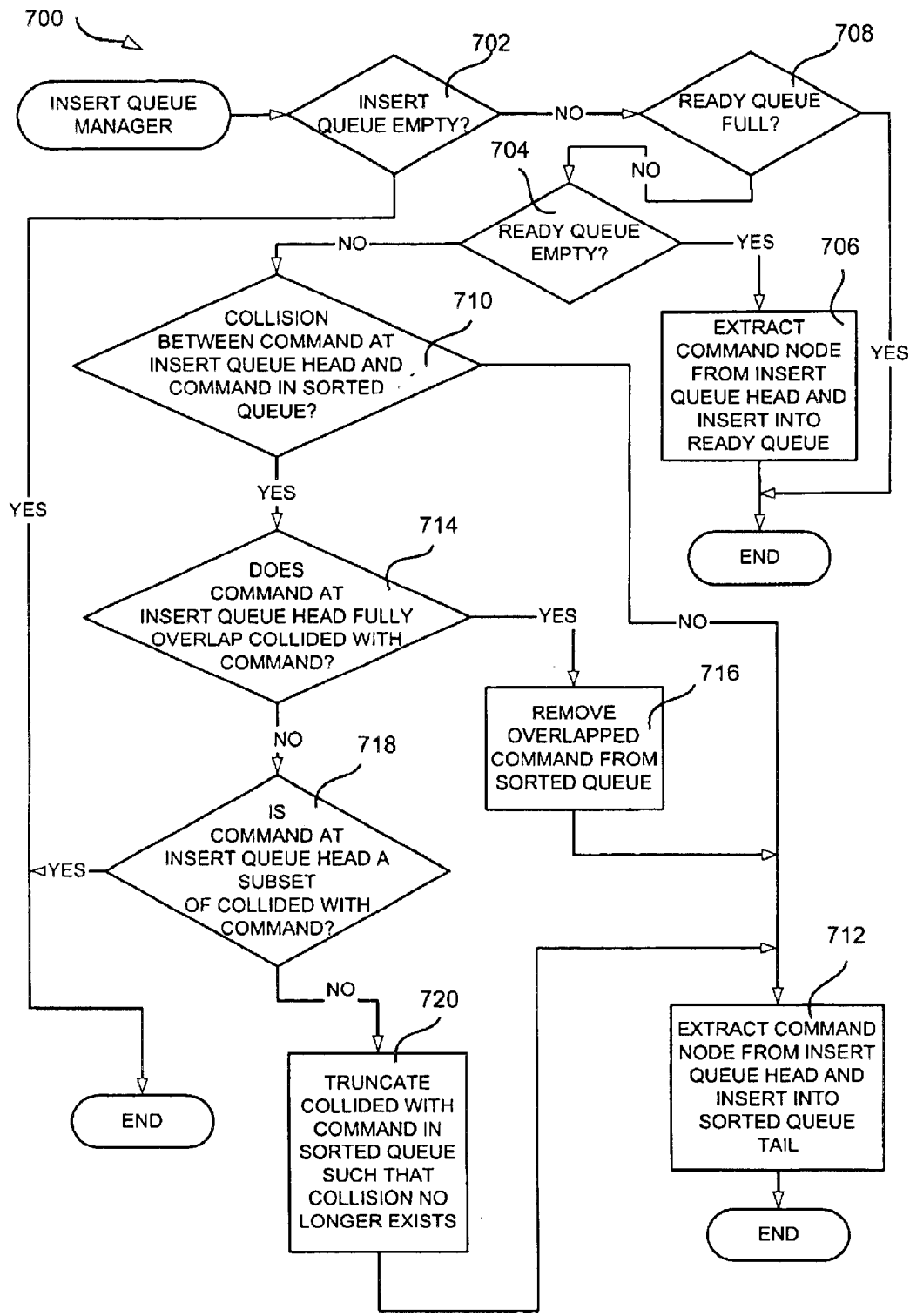
FIG. 7. illustrates an exemplary operational flow of an insert queue manager for the command node queue processor shown in FIG. 3.

As shown in FIG. 5, upon completion of the command manager routine 600, the scheduler 500, calls the insert queue manager routine 700. As shown in FIG. 7, upon entry into the insert queue manager routine 700, an insert queue empty detector 702 determines or tests whether the insert queue 312 is empty. If the insert queue 312 is empty, the insert queue manager routine 700 is completed and ended or exited.

If the insert queue 312 is not empty, a ready queue full detector 708 determines or tests whether the ready queue 312 is full. If the ready queue 316 is full, the insert queue manager routine 700 is completed and ended or exited.

If the ready queue 316 is not full, ready queue empty detector 704 determines or tests whether the ready queue 312 is empty. If the ready queue 316 is empty, an extract operation 706 extracts a command node from the head of the insert queue 312 and inserts that command into the ready queue 316 and the insert queue manager routine 700 is completed and ended or exited.

If the ready queue 316 is not empty, a collision detector 710 determines or tests whether there is a collision between the command at the head of the insert queue 312 and a command in the sorted queue 314. If there is not a collision between the command at the head of the insert queue 312 and a command in the sorted queue 314, an extract operation 712 extracts the command at the head of the insert queue 312 and inserts that command into the tail of the sorted queue 314, and the insert queue manager routine 700 is completed and ended or exited.

If there is a collision between the command at the head of the insert queue 312 and a command in the sorted queue 314, an overlap detector 714 determines or tests whether the command at the head of the insert queue 312 fully overlaps the collided with command in the sorted queue 314. If the command at the head of the insert queue 312 fully overlaps the collided with command in the sorted queue 314, a remove operation 716 removes the fully overlapped command from the sorted queue 314. The extract operation 712 then extracts the command at the head of the insert queue 312 and inserts that command into the tail of the sorted queue 314, and the insert queue manager routine 700 is completed and ended or exited.

If the command at the head of the insert queue 312 does not fully overlap the collided with command in the sorted queue 314, a subset detector 718 determines or tests whether the command at the head of the insert queue 312 is a subset of the collided with command in the sorted queue 314. If the command at the head of the insert queue 312 is a subset of the collided with command in the sorted queue 314, the insert queue manager routine 700 is completed and ended or exited.

If the command at the head of the insert queue 312 is not a subset of the collided with command in the sorted queue 314, it can be assumed that the command at the head of the insert queue 312 partially overlaps the collided with command in the sorted queue 314. A truncate operation 720 then truncates the command in the sorted queue. The extract operation 712 then extracts the command at the head of the insert queue 312 and inserts that command into the tail of the sorted queue 314, and the insert queue manager routine 700 is completed and ended or exited.

If the command at the head of the insert queue 312 is a subset of the collided with command in the sorted queue 314, the insert queue manager routine 700 is completed and ended or exited.

Figure 8:
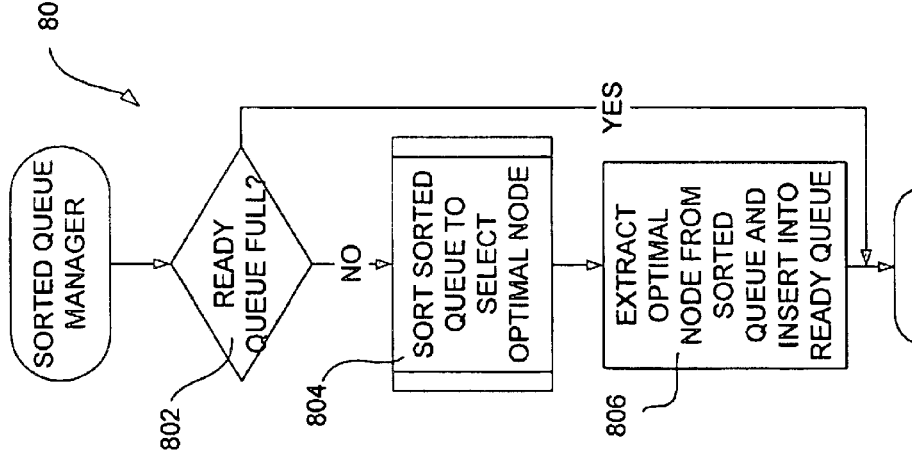
FIG. 8. illustrates an exemplary operational flow of a sorted queue manager for the command node queue processor shown in FIG. 3.

As shown in FIG. 5, upon completion of the insert queue manager routine 700, the scheduler 500 preferably calls a sorted queue manager routine 800. As shown in FIG. 8, upon entry into the sorted queue manager routine 800, a ready queue full detector 802 determines or tests whether the ready queue 316 is full. If the ready queue 316 is full, the sorted queue manager routine 800 is completed and ended or exited. If the ready queue 316 is not full, a sort operation 804 sorts the sorted queue 314 to determine the optimal node to be inserted into the ready queue 316.

As described above, the sort operation 804 typically will compare various fields within the command nodes in the sorted queue 314 to determine the preferred or optimal command node for a specified optimization. A number of different sorting algorithms may be used by the sort operation 804 to determine which of the nodes in the sorted queue 314 is optimal. However, a Rotational Positioning Sorting (RPS) or traveling salesmen type algorithm is preferably used by the sort operation 804 to the sorted queue 314. Once an optimal command node has been determined, an extract operation 806 extracts the optimal command node from the sorted queue 314 and inserts the optimal command node into the ready queue 316. The sorted queue manager routine 800 is then completed and ended or exited.

Figure 9:
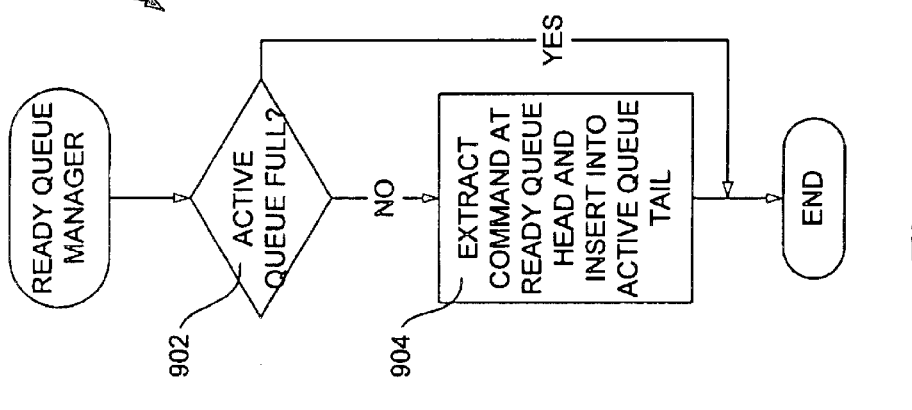
FIG. 9. illustrates an exemplary operational flow of a ready queue manager for the command node queue processor shown in FIG. 3.

As shown in FIG. 5, upon completion of the sorted queue manager routine 800, the scheduler 500 preferably calls a ready queue manager routine 900. As shown in FIG. 9, upon entry into the ready queue manager routine 900, an active queue full detector 902 determines or tests whether the active queue 318 is full. If the active queue 318 is full, the ready queue manager routine 900 is completed and ended or exited. If the active queue 318 is not full, an extract operation 904 extracts the command node at the head of the ready queue 316 and inserts that command node into the active queue 316. The ready queue manager routine 900 is then completed and ended or exited.

Figure 10:
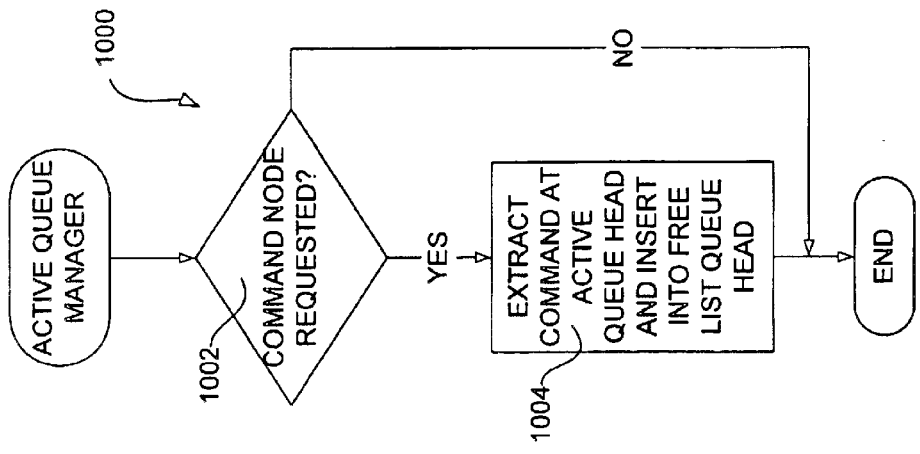
FIG. 10. illustrates an exemplary operational flow of an active queue manager for the command node queue processor shown in FIG. 3.

As shown in FIG. 5, upon completion of the ready queue manager routine 900, the scheduler 500 preferably calls an active queue manager routine 1000. As shown in FIG. 10, upon entry into the active queue manager routine 1000, a command node requested detector 1002 determines or tests whether a command node has been requested by the microprocessor. If a command node has been requested by the microprocessor, the extract operation 1004 extracts the command node at the head of the active queue 318 and inserts the command node into the head of the free-list queue 310, thereby "recycling" the command node for further use by the queue processor 300. If the command node at the head of the active queue 318 has not been requested, the active queue manager routine 1000 is then completed and ended or exited.

In summary, in view of the foregoing discussion it will be understood that a first embodiment of the present invention provides a method of selecting an optimal command node in a computing device (such as 216) having an insert queue (such as 312) contain at least one command node (such as 320) and a sorted queue (such as 366) containing another command node (such as 316). The method includes the steps of determining if the command node in the insert queue collides with the command node in the sorted queue (such as 710). If the command node in the insert queue does not collide with the command node in the sorted queue, then the command node in the insert queue is moved from the insert queue into the sorted queue (such as 712). If the command node in the insert queue collides with the command node in the sorted queue, then the collision is corrected (such as 714 and 716 or 718 and 720). The sorted queue is then sorted (such as 804) according to a predetermined routine to determine the optimal command node and the optimal command node is selected (such as 804).

In the first embodiment of the invention, the computing device is preferably a disc drive device (such as 100) having a magnetic disc (such as 108). Each of the command nodes in the first embodiment of the invention preferably includes information (such as 320) which defines a range of addresses on the magnetic disc. Additionally, the step of determining if the command node in the insert queue collides with the command node in the sorted queue preferably comprises determining if the range of addresses defined by the command node in the insert queue overlaps, is a subset of, a superset of the range of addresses defined by the command node in the sorted queue (such as 714 and 718).

Additionally, in the first embodiment of the present invention the predefined routine for sorting the sorted queue (such as 804) preferably comprises a Rotational Positioning Sorting (RPS) algorithm.

An alternative embodiment of the present invention contemplates a method of populating a ready queue (such as 316) in disc drive computing device (such as 100) with read/write command nodes (such as 320). Wherein the disc drive computing device includes an insert queue (such as 312) containing a command node (such as 366) and a sorted queue (such as 314) containing another command node (such as 364). The method preferably determines if the ready queue is empty (such as 704). Additionally, the step of determining if the ready queue is empty further includes the steps of moving the command node from the insert queue into the ready queue if the read queue is empty (such as 706) or determining if the command node in the insert queue collides with the command node in the sorted queue if the ready queue is not empty (such as 710).

In this alternate embodiment, if the command node in the insert queue does not collide with the command node in the sorted queue, the command node in the insert queue is moved from the insert queue into the sorted queue (such as 712). If the command node in the insert queue does collide with the command node in the sorted queue, a determination is made as to whether the command node in the insert queue fully overlaps the command node in the sorted queue (such as 714). If the command node in the insert queue fully overlaps the command node in the sorted queue, the command node in the insert queue is removed from the sorted queue (such as 716) and the command node in the insert queue is moved from the insert queue into the sorted queue (such as 712). If the command node in the insert queue does not fully overlap the command node in the sorted queue, a determination is made as to whether the command node in the insert queue is a subset of the command node in the sorted queue (such as 718). If the command node in the insert queue is not a subset of the command node in the sorted queue, the command node in the sorted queue is truncated such that a collision no longer exists (such as 720), and the command node in the insert queue is moved from the insert queue into the sorted queue (such as 712). Finally, regardless of whether the command node in the insert queue collides with the command node in the sorted queue, if the ready queue is not empty, the ready queue is sorted according to a predetermined method (such as 804) to determine the optimal command node and the optimal command node is moved into the ready queue (such as 804).

Another alternative embodiment of the present invention contemplates a method for managing a command node in a computing system having a microprocessor (such as 216), an insert queue (such as 312), a sorted queue (such as 314), and a ready queue (such as 316). The method begins with the step of inserting the command node into the insert queue (such as 608). A determination is then made as to whether the ready queue is empty (such as 704). If the ready queue is empty, the command node is extracted from the insert queue and inserted into the ready queue (such as 706). If the ready queue is not empty, a determination is made as to whether the command node collides with any command in the sorted queue (such as 710). If the command node does not collide with any command in the sorted queue, the command node is extracted from the insert queue and inserted into the sorted queue (such as 712). If the command node does collide with a command in the sorted queue, the collision is corrected (such as 714 and 716 or 718 and 720), and the command node is extracted from the insert queue and inserted into the sorted queue (such as 712). Finally, regardless of whether the command node collides with a command node in the sorted queue, if the ready queue is not empty, it is determined if the command node is the optimal command node in the sorted queue (such as 804), if the command node is the optimal command node in the sorted queue the command node is extracted from the sorted queue and inserted into the ready queue (such as 804).

Yet another alternative embodiment of the present invention contemplates a computer-readable media (such as 210) having stored therein an insert queue (such as 312), a sorted queue (such as 314), a ready queue (such as 316), a number of queue managers (such as 600, 700, and 800), and a scheduler (such as 500) for scheduling the execution of the queue managers in a microprocessor. Each of the queue managers preferably comprises microprocessor-executable code operable for directing a microprocessor (such as 216). A command queue manager (such as 600) is operable for populating command nodes with command data (such as 606) and for inserting populated command nodes into the insert queue (such as 608). An insert queue manager (such as 700) is operable for determining whether a command node within the insert queue collides with a command node in the sorted queue (such as 710), for correcting any collisions between a command node within the insert queue and a command node in the sorted queue (such as 714 and 716 or 718 and 720), and for extracting a non-colliding command node from the insert queue and inserting the non-colliding command node into the sorted queue (such as 712). A sorted queue manager (such as 800) is operable for selecting an optimal command node from the sorted queue in accordance with a predefined sorting scheme (such as 804).

A further embodiment of the present invention contemplates a queue processing system for managing a number of command node queues in a data storage device (such as 100). The queue processing system includes a microprocessor (such as 216) and queue processing means (such as 700 and 800) for controlling the position and flow of command nodes within and through the number of command queues.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the queue processor 300 may be implemented with fewer than the five queues shown in FIG. 3. In particular, another mechanism may be used other than the free list 310 to supply command nodes to the queue processor 300. Additionally, the queue processor 300 may be implemented without the active queue 318. In this case, the ready queue 316 would serve as the repository for command nodes waiting to be processed by the processor. As noted above, the queue processor 300 is not restricted solely to use in a disc drive device. The queue processor may be employed in any number of other computer based implementations or environments. As also noted above, the queue processor 300 may use a number of other suitable scheduling algorithms or processes other than the simple round robin type scheduler 500 described above. Indeed, the queue processor may not have a scheduler at all. For example, each of the queue managers may be arranged sequentially in a single continual computer executable routine. Additionally, the order of execution of the various queue managers may be other than outlined above. Numerous other changes may be made which will readily suggest themselves to those skilled in the art and which are encompassed in the spirit of the invention disclosed and as defined in the appended claims.

What is claimed is:

1. A method comprising steps of:
   (a) determining if a command node in a first queue collides a command node in a second queue:
      (a)(i) if the command node in the insert queue does not collide with the command node in the second queue, then moving the command node in the first queue from the first queue into the second queue;
      (a)(ii) if the command node in the first queue collides with the command node in the second queue, then correcting the collision.

2. The method of claim 1, wherein the act of moving the command node in the first queue from the first queue into the second queue comprises extracting the command node from the first queue and inserting the extracted command node into the second queue.

3. A computer-readable media having computer-executable instructions for performing the steps recited in claim 1.

4. The method of claim 1, further comprising the steps of:
   sorting the second queue according to a predetermined routine to determine an optimal command node; and
   selecting the optimal command node.

5. The method of claim 4, wherein the predefined routing comprises a Rotational Positional Sorting (RPS) algorithm to optimize rotational latency.

6. A method of selecting an optimal command node in a computing device having a first queue containing a command node and a second queue containing another command node, the method comprising steps of:
  (a) determining if the command node in the first queue collides with the command node in the second queue:
    (a)(i) if the command node in the first queue does not collide with the command node in the second queue, then moving the command node in the first queue from the first queue into the second queue;
    (a)(ii) if the command node in the first queue collides with the command node in the second queue, then correcting the collision; and
  (b) sorting the second queue according to a predetermined routine to determine an optimal
  command node and selecting the optimal command node, wherein the computing device is a disc drive device having a magnetic disc, wherein each command node includes information defining a range of addresses on the magnetic disc, and wherein the determining step (a) comprises, determining if the range of addresses defined by the command node in the first queue overlaps the range of addresses defined by the command node in the second queue, is a subset of the range of addresses defined by the command node in the second queue, or is a superset of the range of addresses defined by the command node in the second queue.

7. A method of selecting an optimal command node in a computing device having a first queue containing a command node and a second queue containing another command node, the method comprising steps of:
  (a) determining if the command node in the first queue collides with the command node
  in the second queue:
    (a)(i) if the command node in the first queue does not collide with the command node in the second queue, then moving the command node in the first queue from the first queue into the second queue;
    (a)(ii) if the command node in the first queue collides with the command node in the second queue, then correcting the collision; and
  (b) sorting the second queue according to a predetermined routine to determine an optimal
  command node and selecting the optimal command node, wherein the collision correction step (a)(ii) comprises the steps of:
    (a)(ii)(A) determine if the command node in the first queue fully overlaps the command node in the second queue;
    (a)(ii)(A)(1) if the command node in the first queue fully overlaps the command node in the second queue, then extracting the overlapped command node from the second queue and moving the command node from the first queue into the second queue;
    (a)(ii)(A)(2) if the command node in the first queue does not fully overlap the command node in the second queue, then determining if the command node in the first queue is a subset of the command node in the second queue:
      (a)(ii)(A)(2)(a) if the command node in the first queue is not a subset of the command node in the second queue, then truncating the overlapped command node in the second queue such that it no longer overlaps the command node in the first queue and moving the command node in the first queue from the first queue into the second queue.

8. A method of populating a ready queue in disc drive computing device with read/write command nodes, the disc drive computing device having an insert queue containing a command node and a sorted queue containing another command node, the method comprising steps of:
(a) determining if the ready queue is empty:
  (a)(i) if the read queue is empty, moving the command node from the insert queue into the ready queue;
  (a)(ii) if the ready queue is not empty, determining if the command node in the insert queue collides with the command node in the sorted queue:
    (a)(ii)(A) if the command node in the insert queue collides with the command node in the sorted queue:
      (a)(ii)(A)(1) determining if the command node in the insert queue fully overlaps the command node in the sorted queue:
        (a)(ii)(A)(1)(a) if the command node in the insert queue fully overlaps the command node in the sorted queue:
          (a)(ii)(A)(1)(a)(i) removing the command node in the sorted queue from the sorted queue; and
          (a)(ii)(A)(1)(a)(ii) moving the command node in the insert queue from the insert queue into the sorted queue;
        (a)(ii)(A)(1)(b) if the command node in the insert queue does not fully overlap the command node in the sorted queue, determining if the command node in the insert queue is a subset of the command node in the sorted queue;
          (a)(ii)(A)(1)(b)(i) if the command node in the insert queue is not a subset of the command, node in the sorted queue:
            (a)(ii)(A)(1)(b)(i)(A) truncating the command node in the sorted queue such that a collision no longer exists, and
            (a)(ii)(A)(1)(b)(i)(B) moving the command node in the insert queue from the insert queue into the sorted queue;
    (a)(ii)(B) if the command node in the insert queue does not collide with the command node in the sorted queue, moving the command node in the insert queue from the insert queue into the sorted queue;
    (a)(ii)(C) sorting the sorted queue according to a predetermined method to determine the optimal command node; and
    (a)(ii)(D) moving the optimal command node into the ready queue.

9. A computer-readable media having computer-executable instructions for performing the steps recited in claim 8.

10. The method of claim 8, wherein the moving step (a)(ii)(A)(1)(a)(ii) comprises,
  extracting the command node in the insert queue from the insert queue and inserting the
  extracted command node into the sorted queue.

11. The method of claim 8, wherein the insert queue, the sorted queue, and the
ready queue each comprise a doubly-linked list, and wherein the command node in the insert queue is the command node at the head of the insert queue, and the moving steps (a)(ii)(A)(1)(a)(ii) and (a)(ii)(A)(1)(b)(i)(B) comprise, extracting the command node in the insert queue from the head of the insert queue and inserting the extracted command node into the tail of the sorted queue.

12. The method of claim 8, wherein the predetermined method of sorting the sorted queue comprises a Rotational Positioning Sorting (RPS) algorithm.

13. A method for managing a command node in a computing system having a microprocessor, an insert queue, a sorted queue, and a ready queue, comprising:
   (a) inserting the command node into the insert queue;
   (b) determining if the ready queue is empty:
      (b)(i) if the ready queue is empty, extracting the command node from the insert queue and inserting the command node in the ready queue,
      (b)(ii) if the ready queue is not empty, determining if the command node collides with any command in the sorted queue:
         (b)(ii)(A) if the command node does not collide with any command in the sorted queue, extracting the command node from the insert queue and inserting the command node in the sorted queue;
         (b)(ii)(B) if the command node collides with any command in the sorted queue:
            (b)(ii)(B)(1) correcting the collision;
            (b)(ii)(B)(2) extracting the command node from the insert queue; and
            (b)(ii)(B)(3) inserting the command node in the sorted queue;
         (b)(iii)(C) determining if the command node is the optimal command node in the sorted queue, if the command node is the optimal command node in the sorted queue extracting the command node from the sorted queue and inserting the command node in the ready queue.

14. The method of claim 13, wherein before inserting step (a) the command node is extracted from a free list and populated with command data.

15. The method of claim 13, wherein the computing system further includes an active queue, the method further comprising:
   (c) determining if the active queue is full, if the active queue is not full exacting the command node from the ready queue and inserting the command node in the active queue.

16. The method of claim 15, further comprising:
   (d) determining if a command node is being requested by the microprocessor, if a command node is being requested by the microprocessor extracting the command node from the active queue and inserting the command node into a free list.

17. The method of claim 13, wherein the insert queue, the sorted queue, and the ready queue each comprises a doubly-linked list of command nodes.

18. The method of claim 13, wherein the computing system comprises a disc drive microprocessor and an associated memory and where the command node comprises a command node for implementing a read/write command in the disc drive.

19. The computer-readable media of claim 18 wherein the insert queue, the sorted queue, and the ready queue each comprises a doubly-linked list of command nodes, and wherein each of the command nodes includes data for implementing a read/write command in a microprocessor of a disc drive device.

20. Computer-readable media having stored thereon:
   an insert queue;
   a sorted queue;
   a ready queue;
   a plurality of queue managers, each queue manager comprising microprocessor-executable code operable for directing a microprocessor, the plurality of queue managers including:
      a command queue manager operable for populating command nodes with command data and for inserting populated command nodes into the insert queue;
      an insert queue manager operable for determining whether a command node within the insert queue collides with a command node in the sorted queue, for correcting any collisions between a command node within the insert queue and a command node in the sorted queue, and for extracting a non-colliding command node from the insert queue and inserting the non-colliding command node into the sorted queue;
      a sorted queue manager operable for selecting an optimal command node from the sorted queue in accordance with a predefined sorting scheme; and
      a scheduler for scheduling the execution of the queue managers in a microprocessor.

21. The computer-readable media of claim 20, wherein the sorted queue manager is further operable for extracting the selected command node from the sorted queue and inserting the selected command node into the ready queue.

22. The computer-readable media of claim 20, further having stored thereon an active queue and a ready queue manager, the ready queue manager being operable for extracting a preferred command node from the ready queue and for inserting the extracted preferred command node into the active queue.

23. The computer-readable media of claim 22, further having stored thereon a free list queue and an active queue manager operable for extracting a requested command node from the active queue and for inserting the requested command node into the free list queue.

24. A system for managing command nodes in a computing device comprising:
   a microprocessor;
   computer-readable media;
   a data structure stored on the computer-readable media, the data structure comprising:
      a first queue comprising a command node;
      a second queue comprising a command node selected from the first queue, and
      a third queue comprising a command node selected from the second queue according to an predefined optimization scheme.

25. The system of claim 24, wherein the second queue includes only non-colliding command nodes.

26. The system of claim 25, further including a fourth queue including a command node selected from the third queue.

27. The system of claim 26, wherein the fourth queue comprises two command nodes both of which are accessible by the microprocessor.

28. The system of claim 26, further including a fifth queue from which command nodes have been extracted, populated with command data, and inserted into the first queue.

29. The system of claim 24, wherein each of the queues is structured as a doubly-linked list having a head and a tail.

30. The system of claim 29, wherein each queue has an associated head pointer which points the command node at the head of the associated queue and an associated tail pointer which points the command node at the tail of the associated queue.

31. The system of claim 30, wherein the microprocessor includes a plurality of
registers and wherein each of the head pointers and each of the tail pointers is stored in an associated register in the microprocessor.

32. A queue processing system for managing a plurality of command node queues in a data storage device comprising:

a microprocessor; and a queue processing means for controlling, including collision correction, the position and flow of command nodes within and through the plurality of command queues.

33. The queue processing system of claim 32, wherein at least one of the command nodes is repositioned from one of the plurality of command node queues to another of the plurality of command node queues upon a determination and correction of a collision between the at least one command node and a command node in the another of the plurality of command node queues.

* * * * *